(12) United States Patent
Noordhuis et al.

(10) Patent No.: US 11,944,230 B2
(45) Date of Patent: Apr. 2, 2024

(54) AIR PURGE GROOVE (71) Applicant: Koninklijke Douwe Egberts B.V., Utrecht (NL)

(72) Inventors: Joeke Noordhuis, Groningen (NL); Andrea Favero, Groningen (NL); Judith Margreet Hanneke Ogink, Beetsterzwaag (NL); Johan Van Toor, Drachten (NL); Gerbrand Kristiaan De Graaff, Hillegom (NL); Jarno Beekman, Tuk (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 152 days.

(21) Appl. No.: 17/312,911

(22) PCT Filed: Dec. 12, 2019

(86) PCT No.: PCT/NL2019/050831
§ 371 (c)(1),
(2) Date: Jun. 10, 2021

(87) PCT Pub. No.: WO2020/122722
PCT Pub. Date: Jun. 18, 2020

(65) Prior Publication Data
US 2022/0061580 A1  Mar. 3, 2022

(30) Foreign Application Priority Data

Dec. 12, 2018 (NL) .......................... 2022190

(51) Int. Cl.
*A47J 31/36* (2006.01)
*B65D 85/804* (2006.01)

(52) U.S. Cl.
CPC ....... *A47J 31/3623* (2013.01); *A47J 31/3676* (2013.01); *B65D 85/8043* (2013.01); *A47J 31/369* (2013.01)

(58) Field of Classification Search
CPC ................ A47J 31/3623; A47J 31/3628; A47J 31/3676; A47J 31/3695; A47J 31/369
See application file for complete search history.

(56) References Cited

U.S. PATENT DOCUMENTS

| 4,775,048 A | 10/1988 | Baecchi |
| 4,787,299 A | 11/1988 | Levi |

(Continued)

FOREIGN PATENT DOCUMENTS

| AU | 2013305155 | 3/2015 |
| AU | 2019397122 | 7/2021 |

(Continued)

OTHER PUBLICATIONS

International Search Report dated Jan. 30, 2020, International Application No. PCT/NL2019/050831 (6 pgs.).

(Continued)

*Primary Examiner* — Reginald Alexander
(74) *Attorney, Agent, or Firm* — Fitch, Even, Tabin & Flannery LLP (57) ABSTRACT

System for preparing a quantity of beverage suitable for consumption, the system comprising an exchangeable capsule (4A, 4B) having a cup-shaped body (6A, 6B) and a lid (12A, 12B) and comprising an apparatus. The apparatus comprises a first brew chamber part (18) having a cavity for holding the exchangeable capsule (4A, 4B) and a second brew chamber part (20) for closing the first brew chamber part (18) to form a brew chamber (16). The second brew chamber part (20) has a sealing member (36, 37) for providing a liquid sealing engagement between the second (Continued)

brew chamber part (20) and the lid (12A, 12B) of the exchangeable capsule (4A, 4B). The sealing member (36, 37) comprises an air purge groove (40) forming an air purge opening between the sealing member (36, 37) and the lid (12A, 12B) of the capsule for allowing air in the brew chamber (16) to escape to an exterior of the apparatus while pressurised liquid is supplied into the brewing chamber (16) for preparing the beverage.

17 Claims, 6 Drawing Sheets

(56) References Cited

U.S. PATENT DOCUMENTS

| | | | |
|---|---|---|---|
| 5,197,374 | A | 3/1993 | Fond |
| 5,964,142 | A | 10/1999 | Tio |
| 6,026,732 | A | 2/2000 | Kollep |
| 7,216,582 | B2 | 5/2007 | Yoakim |
| 7,337,704 | B2 | 3/2008 | Hammad |
| 7,607,385 | B2 | 10/2009 | Halliday |
| 8,365,585 | B2 | 2/2013 | Barra |
| 8,770,095 | B2 | 7/2014 | Pecci |
| 8,836,956 | B2 | 9/2014 | Jarisch |
| 8,904,922 | B2 | 12/2014 | Pagano |
| 9,167,934 | B2 | 10/2015 | Höglauer |
| 9,439,532 | B2 | 9/2016 | Crarer |
| 10,011,421 | B2 * | 7/2018 | Bartoli ............... A47J 31/3633 |
| 2001/0011502 | A1 | 8/2001 | Bonanno |
| 2003/0066431 | A1 | 4/2003 | Fanzutti |
| 2003/0159589 | A1 * | 8/2003 | Meador ............... A47J 31/3623 |
| | | | 99/295 |
| 2004/0197444 | A1 | 10/2004 | Halliday |
| 2005/0223904 | A1 | 10/2005 | Laigneau |
| 2006/0075902 | A1 | 4/2006 | Magno |
| 2006/0266224 | A1 | 11/2006 | Hammad |
| 2008/0006159 | A1 | 1/2008 | Fischer |
| 2008/0245236 | A1 | 10/2008 | Ternite |
| 2011/0000377 | A1 | 1/2011 | Favre |
| 2011/0142996 | A1 | 6/2011 | Marc |
| 2011/0185910 | A1 | 8/2011 | Ryser |
| 2011/0297005 | A1 | 12/2011 | Mariller |
| 2012/0000371 | A1 | 1/2012 | Blanchino |
| 2012/0240779 | A1 | 9/2012 | Perentes |
| 2013/0099597 | A1 | 4/2013 | Perentes |
| 2013/0220138 | A1 | 8/2013 | Deuber |
| 2013/0247774 | A1 | 9/2013 | Macchiavelli |
| 2013/0323366 | A1 | 12/2013 | Gerbaulet |
| 2014/0053734 | A1 | 2/2014 | Santi |
| 2014/0227414 | A1 | 8/2014 | Perentes |
| 2014/0263780 | A1 | 9/2014 | Day, Jr. |
| 2014/0290495 | A1 | 10/2014 | Perentes |
| 2014/0299000 | A1 | 10/2014 | Hanneson |
| 2015/0059587 | A1 | 3/2015 | Colleoni |
| 2015/0068405 | A1 * | 3/2015 | Bartoli ................. A47J 31/407 |
| | | | 426/115 |
| 2015/0082989 | A1 | 3/2015 | Besson |
| 2015/0104550 | A1 | 4/2015 | Oh |
| 2015/0147448 | A1 | 5/2015 | Lo Foro |
| 2015/0157169 | A1 | 6/2015 | Krüger |
| 2015/0158665 | A1 | 6/2015 | Krüger |
| 2015/0183577 | A1 | 7/2015 | Talon |
| 2015/0225169 | A1 | 8/2015 | Jarisch |
| 2015/0238039 | A1 | 8/2015 | Fischer |
| 2015/0272375 | A1 | 10/2015 | Flick |
| 2015/0272376 | A1 | 10/2015 | Flick |
| 2015/0272380 | A1 | 10/2015 | Flick |
| 2015/0342394 | A1 | 12/2015 | Bonacci |
| 2016/0045060 | A1 | 2/2016 | Flick |
| 2016/0150907 | A1 | 6/2016 | Bolognese |
| 2016/0157666 | A1 | 6/2016 | Brandsma |
| 2016/0309946 | A1 | 10/2016 | Gunstone |
| 2017/0143157 | A1 | 5/2017 | Tentorio |
| 2019/0035942 | A1 | 1/2019 | Kwon |
| 2019/0167031 | A1 | 6/2019 | Rijskamp |
| 2019/0274467 | A1 | 9/2019 | Ogink |
| 2019/0335940 | A1 | 11/2019 | Rijskamp |
| 2019/0335942 | A1 | 11/2019 | Rijskamp |
| 2019/0343324 | A1 | 11/2019 | Rijskamp |
| 2019/0343325 | A1 | 11/2019 | Ogink |
| 2020/0000268 | A1 | 1/2020 | Ogink |
| 2020/0000271 | A1 | 1/2020 | Ogink |
| 2022/0061580 | A1 | 3/2022 | Noordhuis |

FOREIGN PATENT DOCUMENTS

| | | |
|---|---|---|
| CA | 2765324 | 11/2010 |
| CA | 3123195 | 6/2020 |
| CN | 1232212 | 10/1999 |
| CN | 1476304 | 2/2004 |
| CN | 1612831 | 5/2005 |
| CN | 101123905 | 2/2008 |
| CN | 101389551 | 3/2009 |
| CN | 100480150 C | 4/2009 |
| CN | 101610703 | 12/2009 |
| CN | 201481108 | 5/2010 |
| CN | 101795605 | 8/2010 |
| CN | 102188161 | 9/2011 |
| CN | 102245065 | 11/2011 |
| CN | 102740745 | 10/2012 |
| CN | 103002781 | 3/2013 |
| CN | 103124509 | 5/2013 |
| CN | 202960135 | 6/2013 |
| CN | 103648340 | 3/2014 |
| CN | 103829804 | 6/2014 |
| CN | 104244780 | 12/2014 |
| CN | 104271012 | 1/2015 |
| CN | 104736021 | 6/2015 |
| CN | 104837385 | 8/2015 |
| CN | 104869874 | 8/2015 |
| CN | 104884368 | 9/2015 |
| CN | 104902792 | 9/2015 |
| CN | 105431358 | 3/2016 |
| CN | 105530842 | 4/2016 |
| CN | 105792714 | 7/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1208782 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 | 11/2007 |
| EP | 2033551 | 3/2009 |
| EP | 2037781 | 3/2009 |
| EP | 2071986 | 6/2009 |
| EP | 2071987 | 6/2009 |
| EP | 2109387 | 10/2009 |
| EP | 2230195 | 9/2010 |
| EP | 2374383 | 10/2011 |
| EP | 2378932 | 10/2011 |
| EP | 2409608 | 1/2012 |
| EP | 2409609 | 1/2012 |
| EP | 2471420 | 7/2012 |
| EP | 2515725 | 10/2012 |
| EP | 2656755 | 10/2013 |
| EP | 2687133 | 1/2014 |
| EP | 2833766 | 2/2015 |
| EP | 2884874 | 6/2015 |

(56) References Cited

FOREIGN PATENT DOCUMENTS

| | | |
|---|---|---|
| JP | 2021533675 | 12/2021 |
| NL | 2022190 | 7/2020 |
| RU | 2506031 | 2/2014 |
| RU | 2589576 | 7/2016 |
| RU | 2591768 | 7/2016 |
| RU | 2626940 | 8/2017 |
| WO | 9517121 | 6/1995 |
| WO | 0243541 | 6/2002 |
| WO | 03059778 | 7/2003 |
| WO | 2006005736 | 1/2006 |
| WO | 2006066625 | 6/2006 |
| WO | 2007096196 | 8/2007 |
| WO | 2008004116 | 1/2008 |
| WO | 2008014830 | 2/2008 |
| WO | 2008096385 | 8/2008 |
| WO | 2010013274 | 2/2010 |
| WO | 2010029512 | 3/2010 |
| WO | 2010076698 | 7/2010 |
| WO | 2010134054 | 11/2010 |
| WO | 2011042401 | 4/2011 |
| WO | 2011069830 | 6/2011 |
| WO | 2011113854 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | 2013008141 | 1/2013 |
| WO | 2013079814 | 6/2013 |
| WO | 2014012778 | 1/2014 |
| WO | 2014012779 | 1/2014 |
| WO | 2014041605 | 3/2014 |
| WO | 2014056641 | 4/2014 |
| WO | 2014056642 | 4/2014 |
| WO | 2014056730 | 4/2014 |
| WO | 2014056810 | 4/2014 |
| WO | 2014056821 | 4/2014 |
| WO | 2014056862 | 4/2014 |
| WO | 2014060370 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082662 | 6/2015 |
| WO | 2015082663 | 6/2015 |
| WO | 2015082664 | 6/2015 |
| WO | 2015086371 | 6/2015 |
| WO | 2015109052 | 7/2015 |
| WO | 2015124627 | 8/2015 |
| WO | 2015144356 | 10/2015 |
| WO | 2015155145 | 10/2015 |
| WO | 2015158838 | 10/2015 |
| WO | 2015173123 | 11/2015 |
| WO | 2015193744 | 12/2015 |
| WO | 2016012562 | 1/2016 |
| WO | 2016055633 | 4/2016 |
| WO | 2016071795 | 5/2016 |
| WO | 2016082029 | 6/2016 |
| WO | 2020122722 | 6/2020 |

OTHER PUBLICATIONS

"A Chronology of Nestle Nespresso SA Corporate History—From 1970 to 1985, 15 Years of Research", Nespresso.com, WayBackMachine, Internet Archive, 2 P., Sep. 9, 2006 (2 pgs.).
"About Us—The Company", Nespresso, 8 P., 2008 (8 pgs.).
"Coffee Machine: All Nespresso Models for Australia", Nespresso, WaybackMachine, 2 P., Sep. 8, 2006 (2 pgs.).
"Cremesso", Slide Show, 5 P., 2021 (5 pgs.).
"Eugster Brew Chamber", 3 Photos, 2021 (3 pgs.).
"Nespresso® Essenza D90—Instruction Manual", Nespresso, TSM® Success Manual, ElectroSuisse, 7 P., Jan. 2006 (7 pgs.).
"Nespresso® N90/N9—Instruction for Use", Jura Elektroapparate, Switzerland, User Manual, p. 1-22, Jan. 2005 (22 pgs.).
"The Nespresso History: From A Simple Idea to a Unique Brand Experience", Nestle Nespresso SA, Corporate Communications, p. 1-5, Apr. 2015 (5 pgs.).
"Tschibo Caffisimo K-Fee", Tschibo, Product Description, Short Summary, 7 P., 2013 (7 pgs.).
"Tschibo Caffisimo COMPACT", Tschibo, Product Description, Short Summary, 8 P., Mar. 27, 2013 (8 pgs.).
"Tschibo Caffisimo DUO", Product Description, Short Summary, 8 P., 2013 (8 pgs.).
"Tschibo Caffisimo PICCO", Tschibo, Product Description, Short Summary, 9 P., Sep. 27, 2013 (9 pgs.).
"Z2 Samba Future Proof Versus Nestle . . . ", KDE, p. 1-3, Mar. 7, 2016 (3 pgs.).
International Search Report and Written Opinion dated Jan. 17, 2018, International Application No. PCT/NL2017/050522 (17 pgs.).
International Search Report and Written Opinion dated Nov. 20, 2017, International Application No. PCT/NL2017/050510 (10 pgs).
International Search Report and Written Opinion dated Nov. 23, 2017, International Application No. PCT/NL2017/050514 (8 pgs.).
International Search Report and Written Opinion dated Nov. 27, 2017, International Application No. PCT/NL2017/050512 (10 pgs.).
International Search Report and Written Opinion dated Nov. 27, 2017, International Application No. PCT/NL2017/050515 (10 pgs.).
International Search Report and Written Opinion dated Jan. 30, 2020, International Application No. PCT/NL2019/050831 (12 pgs.).
International Search Report and Written Opinion dated Nov. 30, 2017, International Application No. PCT/NL2017/050511 (9 pgs).
International Search Report and Written Opinion dated Dec. 4, 2017, International Application No. PCT/NL2017/050521 (8 pgs.).
International Search Report and Written Opinion dated Jun. 2018, International Application No. PCT/NL2017/050509 (11 pgs.).
Official Action dated Nov. 24, 2020 From the US Patent and Trademark Office Re. U.S. Appl. No. 16/261,826. (20 pgs.).
English translation of Russian Decision to Grant, dated Aug. 3, 2023, Russian Patent Application No. 2021119929 (8 pgs.).

* cited by examiner

AIR PURGE GROOVE

CROSS REFERENCE TO RELATED APPLICATIONS

This application is a U.S. national phase application of International Application No. PCT/NL2019/050831, filed Dec. 12, 2019, which claims benefit from the Netherlands Application 2022190, filed Dec. 12, 2018, which are each hereby incorporated herein by reference in their entirety.

Field

The invention generally relates to a system for preparing a beverage. In particular the invention relates to a system for preparing a beverage using a capsule.

Background

Systems for preparing a beverage, in particular using an exchangeable capsule containing a beverage ingredient such as ground coffee, tea, soluble coffee powder, milk, or concentrates thereof etc., are known from the state of the art. In such known systems the beverage is prepared by mixing the beverage ingredient with a liquid, such as water, in a brewing cycle wherein the exchangeable capsule is received in a brew chamber of a beverage preparation apparatus and the liquid is supplied under pressure to the capsule by a liquid dispensing device of the apparatus. The beverage is drained from the capsule and released from the brew chamber through an outlet of the brew chamber and will usually flow through a spout opening of the apparatus into a receptacle such as a cup. The known systems typically employ a sealing means between the capsule and a wall section of the brew chamber in order to liquid tightly seal any free space forming a possible liquid flow path between the capsule and the brew chamber wall to prevent the supplied pressurized liquid from bypassing the capsule in the brew chamber when flowing to the brew chamber outlet. This is to minimise waste as well as to improve control over the amount of liquid being brought in contact with the beverage ingredient in the capsule, which affects the quality of the beverage being obtained.

At the end of a brewing cycle, when pressurized liquid is no longer supplied by the liquid dispensing device to the brew chamber, not all liquid in the brew chamber will have been released from the brew chamber, but some liquid may still, at least temporarily, be present in the brew chamber, be it around the capsule or in the capsule. This remaining liquid may, due to the fact that pressurized liquid is no longer supplied, flow relatively slowly through the outlet of the brew chamber, causing dripping at the spout opening of the beverage preparation apparatus. This so-called after-dripping effect in the known systems is a disadvantage as a beverage obtained with relatively long after-drip is typically of inferior quality, and moreover after-dripping results in prolonged waiting time for a user of the system.

SUMMARY

In light of the above it is an object of the present invention to overcome the disadvantage of the known systems. In particular, it is an object of the invention to provide a system for the preparation of a beverage that eliminates or at least diminishes after-dripping.

To this end, according to a first aspect of the invention there is provided a system for preparing a quantity of beverage suitable for consumption, the system comprising:

an exchangeable capsule, the exchangeable capsule comprising a cup-shaped body and a lid; the cup-shaped body having a bottom, a circumferential wall and a flange, the lid being sealed to the flange; and an apparatus comprising a first brew chamber part having a cavity for holding the exchangeable capsule and a second brew chamber part for closing the first brew chamber part to form a brew chamber, the second brew chamber part comprising a sealing member for providing a liquid sealing engagement between the second brew chamber part and the lid of the exchangeable capsule, wherein the sealing member comprises an air purge groove forming an air purge opening between the sealing member and the lid of the capsule for allowing air in the brew chamber to escape to an exterior of the apparatus while pressurised liquid is supplied into the brewing chamber for preparing the beverage.

It was found that air retained in the brew chamber during a brewing cycle contributes to the after-dripping effect. When the exchangeable capsule is received in a brew chamber the volume not occupied by the capsule is filled with air. For example, there may be circumferential volume around the exchangeable capsule defined between the capsule and the wall of the brew chamber as the capsule will not completely fill the volume of the brew chamber. In the prior art systems, any air in the brew chamber, e.g. in a circumferential volume around the capsule, is prevented from escaping from the brew chamber due to the liquid tight seal between the parts bouncing the brew chamber and the capsule. This trapped air will be compressed due to a pressure built up in the brew chamber under the effect of liquid supply to the brew chamber during the brewing cycle. At the end of the brewing cycle, when the liquid supply to the brew chamber has stopped, the compressed air will expand causing liquid that is still retained in the brew chamber, for example in the capsule, to flow out of the brew chamber through the outlet. This results in dripping at a spout opening of the beverage preparation apparatus. The after-dripping effect may even be amplified when liquid is supplied to the brew chamber at an elevated temperature.

In accordance with the invention, the air purge opening bounded by the sealing member on the second brew chamber part and lid of the capsule provides an air vent that enables air to escape from the brew chamber, for instance to an exterior of the beverage preparation apparatus at least in the first phase of the supply of liquid to the brew chamber. Accordingly, the air purge opening allows for de-airing of the brew chamber in the course of a brewing cycle. It is preferred that essentially all air is removed from the brew chamber during a brewing cycle, such that at the end of the brewing cycle there is essentially no air retained in the brew chamber.

Due to the fact that the air is purged from the brewing chamber at least at the beginning of the supply of pressurized liquid, no or at least less air will be present in the brewing chamber at the end of the brewing cycle. In view of the fact that less air is present that may expand, the problem of after-dripping will be alleviated.

As the density of air is much lower compared to supplied liquid, air will rise in the brew chamber when the brew chamber is filled with liquid supplied by the liquid dispensing device. Accordingly, it is preferred that the air purge opening is provided at a high position of the sealing member relative to ground level, such as to allow substantially all air to escape from the brew chamber before liquid reaches the air purge opening.

The brew chamber is formed by a first brew chamber part having a cavity for holding the exchangeable capsule and a second brew chamber part for closing the first brew chamber part so as to allow a user to conveniently load and unload the first brew chamber part with an exchangeable capsule. The brew chamber is formed upon closure of the first brew chamber part by the second brew chamber part. The first and second brew chamber parts may for example be movable with respect to one another to allow opening and closing of the brew chamber. The first brew chamber part may form an inlet side of the brew chamber. The second brew chamber part may form an outlet side of the brew chamber. It is envisioned, however, that the second brew chamber part can define the inlet of the brew chamber and that the first brew chamber part can defined the outlet of the brew chamber.

The air purge groove can be an indentation in the sealing member having opening that is directed to the lid of the capsule. The air purge opening allows air to bypass the sealing member at least directly after the start of the supply of liquid into the brew chamber. In case the sealing member disengages from the exchangeable capsule after a brewing cycle, the open side of the groove is exposed. This provides an easy way of cleaning the air purge opening in case of clogging of the air purge opening that may have occurred during brewing.

It is preferred that the amount of liquid that may flow through the air purge opening as is minimal as this increases waste liquid, may contaminate the beverage preparation apparatus, adversely affects pressure build up in the brew chamber and causes by-pass that may deteriorate the quality of the beverage. The air purge opening can for example be dimensioned in such a way that air is able to pass through, whereas liquid passage is inhibited or prevented entirely. This allows air to escape from the brew chamber through the air purge opening, but when substantially all air has escaped, liquid is prevented or substantially prevented from escaping through the air purge opening. As such, liquid in the brew chamber is forced to flow through the exchangeable capsule. This can be established in many ways.

In an embodiment of the system, the air purge groove is bounded by a resilient material. The material bounding the air purge opening can for example be deformable, preferably elastically deformable. It is envisioned that the material bouncing the air purge groove for example possesses hydrophobic properties, to prevent water from escaping the brew chamber through the air purge opening. For example, the air purge groove may be provided with a hydrophobic coating.

The sealing member may for example comprise a plurality of air purge grooves. It is envisioned that an air purge groove can be dimensioned sufficiently small to be essentially non-restrictive to air but forms large restriction to liquids. For example, the air purge groove may be dimensioned such that the pressure at the air purge groove remains substantially low at an initial phase of a brewing cycle when air is purged from the brew chamber, i.e. the pressure drop over the air purge groove remains sufficiently low so that the lid of the capsule bounding the air purge groove does not close the air purge opening in the initial phase, and when the liquid reaches the air purge groove, the air purge groove can be closed. Closing can be effected due to the fact that the at least the parts of the sealing member which the air purge groove deform under the influence of forces exerted by the capsule or the water on the sealing member. Alternatively or additionally, closing can be effected by the lid of the capsule due to a pressure increase caused by the liquid which is supplied and which leads to the bulging of the lid thereby at least partly occupying the air purge groove and at least partly closing the air purge opening.

In an embodiment, the lid of the capsule is arranged to bulge under the effect of liquid pressure in an interior space of the capsule in such a way as to substantially close the air purge opening. In case the liquid dispensing device supplies an amount of liquid to the brew chamber, the liquid will gradually fill the brew chamber thereby displacing the air in the brew chamber. The air is enabled to escape from the brew chamber through the air purge opening. The relatively low hydraulic resistance of air in comparison to liquid, enables easy passage of air through the air purge opening. The supplied liquid also fills the interior space of the exchangeable capsule thereby increasing the pressure in the interior space of the capsule. The lid of the capsule, is arranged to bulge under the effect of liquid pressure build up in the interior space of the capsule. The bulging of the lid enhances sealing between the sealing member and the capsule, and causes the lid to conform to the shape of the sealing member thereby at least partly closing the air purge opening. It is preferred that the air purge groove in the sealing member is dimensioned in such a way as to cooperate with the lid to close the air purge opening when substantially all air has escaped from the volume of the brew chamber which is not occupied by the capsule.

In an embodiment of the system, the lid can be manufactured from a metal foil, such as aluminium foil, or plastic material, such as polypropylene or polyethylene, or a laminate foil of a metal and plastic. It is preferred that the lid is substantially pliable.

To prevent leakage and enable sufficient pressure build up in the brew chamber, it is advantageous that the brew chamber is sealed. The sealing between first and second brew chamber parts may be in addition to a sealing between the capsule lid and said sealing member of the second brew chamber part. The system may include a locking mechanism for locking the first and second brew chamber parts when forming the brew chamber.

In an embodiment of the system, the air purge opening is in fluid communication with an aperture in the second brew chamber part. This way, no additional venting channels are required which keeps the system simple and reliable. The second brew chamber part may comprise a plurality of apertures. The at least one aperture in the second brew chamber part can be in fluid communication with a spout opening of the apparatus for releasing the prepared beverage in a receptacle for consumption. As such, the air purge opening may be in fluid communication with the spout opening of the beverage apparatus, so as to enable air to escape to the exterior of the apparatus through the spout opening. Optionally, the second brew chamber part comprises an extraction plate for abutting against the lid of the exchangeable capsule when the first brew chamber part holds the exchangeable capsule. This enables fixation or immobilization of the exchangeable capsule in the brew chamber while preparing a beverage. The extraction plate may comprise the at least one aperture. The sealing member may for example be configured circumferentially adjacent an circumference of the extraction plate so as to engage the lid of the capsule and to prevent liquid in the brew chamber which is outside of the capsule to flow around the capsule to the extraction plate thereby bypassing the capsule. The sealing member may for example comprise an annular protrusion arranged to liquid sealingly engage with the lid of the exchangeable capsule.

In an embodiment, the air purge groove may comprise a U-shaped cross-section. A U-shaped air purge groove comprises a smooth shape, i.e. without any discontinuities or sharp edges. This minimises the risk of rupturing or cracking of the material delimiting the groove at these discontinuities, for example as a result of fatigue. In addition, a U-shaped groove is effective in upholding the air purge opening for allowing air to pass through. The U-shaped form also enables closure of the air purge opening by bulging of the lid of the capsule into the groove, thereby following the profile of the groove.

In an embodiment of the system, a cross-sectional area of the air purge groove is approximately between 0.1 and 055 mm$^2$, preferably approximately between 0.2 and 0.3 mm$^2$, more preferably approximately mm$^2$.

In an embodiment of the system, a depth of a cross-section of the air purge groove is approximately between 0.2 and 0.6 mm, preferably approximately between 0.3 and 0.4 mm, more preferably approximately 0.35 MM.

In an embodiment of the system, a width of a cross-section of the air purge groove is approximately between 0.3 and 2.1 mm, preferably approximately between 0.8 and 1.2 mm, more preferably approximately 1 mm.

With these dimensions, it has been established that a good balance between sufficient purging of air at the first phase of supplying liquid to the brewing chamber and a minimal leakage of liquid at a later phase of supplying liquid to the brewing chamber can be obtained.

In an embodiment of the system, the exchangeable capsule is a first exchangeable capsule and the system may further comprise a second exchangeable capsule having a different size than the first exchangeable capsule, the brew chamber being arranged to selectively hold one of the first and second exchangeable capsule. With multiple differently sized capsules the system allows preparation of beverages of various types and quantities dependent on the type.

In a further elaboration of this embodiment, the cavity of the first brew chamber part may be arranged for selectively holding one of the first and second exchangeable capsule.

Especially with a system which can selectively hold a first and a second exchangeable capsule of different sizes, the volume of the brew chamber which is not occupied by a capsule may be large. For example, when a relatively large brew chamber which is dimensioned to tightly hold a large second exchangeable capsule is used to extract a relatively small first exchangeable capsule. When the relatively small first exchangeable capsule is used, a relatively large volume of the brew chamber is not occupied by the capsule and, consequently, a relatively large volume of air will be present in the brew chamber at the start of supplying of liquid to the brew chamber. At the end of the brewing cycle, the relatively large volume of air, which is then compressed, will subsequently expand and the after-dripping problem may be considerable if the air purge groove were not present.

In an embodiment of the system, the first exchangeable capsule and second exchangeable capsule have substantially the same length to diameter ratio. The second capsule may, in appearance, be a (true) magnification in size and shape of the first capsule, giving a same "family" look and feel, recognizable in a store for users. The second capsule is provided with additional capacity for holding beverage ingredients.

In another embodiment, the cavity of the first brew chamber part is arranged for selectively holding one of the first and second exchangeable capsule.

To minimise the space in the brew chamber not occupied by the capsule, in another embodiment of the system, the second brew chamber part is movable into a first and second position, wherein in the first position the first and second brew chamber parts form the brew chamber for holding the first exchangeable capsule, and in the second position the first and second brew chamber parts form the brew chamber for holding the second exchangeable capsule. This way, the volume of the cavity of the first brew chamber part is decreased in case the first brew chamber part is loaded with the first exchangeable capsule. There deliberately remains a first volume in the first brew chamber part not occupied by the first exchangeable capsule when the brew chamber holds the first exchangeable capsule, which first volume is arranged for holding part of the second exchangeable capsule when the brew chamber holds the second capsule. The first brew chamber part may also include a second volume not occupied by the second exchangeable capsule when the brew chamber holds the second exchangeable capsule, which second volume is arranged for receiving the second brew chamber part when the brew chamber holds the first exchangeable capsule. This first and second volume may hold a substantial amount of air, in particular compared to a brew chamber adapted for holding a single size capsule. After-dripping effects may be severe in case the brew chamber is arranged for selectively holding differently sized capsules, in particular the first and second capsules, without an air purge opening provided in the system.

In an embodiment of the system, the second brew chamber part comprises a central portion and a peripheral portion, the central portion being movable into a first position for forming the brew chamber for holding the first exchangeable capsule and a second position forming the brew chamber for holding the second exchangeable capsule. The central portion of the second brew chamber part may for example comprise an extraction plate for abutting against an exit face of the first or second capsule. In the second position, the extraction plate abuts against the exit face of the second capsule. In case a first capsule is inserted, the central portion extends further towards the first position. For example, the central portion may be axially moveable relative to the peripheral portion. The system may include a locking mechanism for locking the central portion in or near the first position, or in a position closer to the first position than the second position, when the cavity holds the first capsule. Optionally, the peripheral portion comprises a further sealing member arranged to provide a liquid sealing engagement between the peripheral portion and the first brew chamber part when forming the brew chamber for holding the second exchangeable capsule. The second capsule can have a sealing surface for sealing against the further sealing member, wherein the sealing surface has an inner diameter that is larger than an outer diameter of the first exchangeable capsule. By providing the sealing surface having an inner diameter that is larger than an outer diameter of the first capsule, a design may be achieved wherein the first capsule may be inserted into the first brew chamber part through the same open end of the first brew chamber part.

Optionally, the sealing member is arranged to provide a sealing engagement between the central portion and the first brew chamber part when forming the brew chamber for the first exchangeable capsule. The sealing member may for example comprise a resilient lip arranged to provide a self-reinforcing sealing engagement between the central portion and the first brew chamber part. Optionally, the resilient lip is arranged to provide a sealing engagement between the central portion and the peripheral portion when forming the brew chamber for holding the second exchangeable capsule.

In an embodiment, the sealing member is an annular front sealing member which is provided on a front face of the second brew chamber part, which front face is directed towards the first brew chamber part.

In a further elaboration of this embodiment, the front sealing member has a diameter which is smaller than the outer diameter of the lid of an exchangeable capsule, so that during a brewing cycle the front sealing member engages the lid.

Thus, at the beginning of the brewing cycle, the air purge groove in the front sealing member will not be occupied by the lid of the capsule but after some time, when the pressure within the cavity of the capsule rises, the lid will deform into the air purge groove and the air purge opening bounded by the air purge groove will be closed at least partially.

In a second aspect of the invention, there is provided an apparatus for preparing a quantity of beverage for application in the system according to the invention, wherein the apparatus comprises:
- a first brew chamber part having a cavity for holding an exchangeable capsule, the capsule comprising a cup-shaped body and a lid; the cup-shaped body having a bottom, a circumferential wall and a flange, the lid being sealed to the flange; and
- a second brew chamber part for closing the first brew chamber part to form a brew chamber, the second brew chamber part comprising a sealing member for providing a liquid sealing engagement between the second brew chamber part and the lid of the exchangeable capsule, wherein the sealing member of the second brew chamber part comprises an air purge groove forming an air purge opening between the sealing member and the lid of the capsule for allowing air in the brew chamber to escape to an exterior of the apparatus while pressurised liquid is supplied into the brewing chamber for preparing the beverage.

With such an apparatus, the same effects and advantages will be obtained as described with reference to the system above.

In an embodiment, the sealing member is an annular front sealing member which is provided on a front face of the second brew chamber part, which front face is directed towards the first brew chamber part.

In a further elaboration of this embodiment, the front sealing member has a diameter which is smaller than the outer diameter of the lid of an exchangeable capsule, so that during a brewing cycle the front sealing member engages the lid.

BRIEF DESCRIPTION OF THE FIGURE

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawings.

DETAILED DESCRIPTION

Figure 1A:
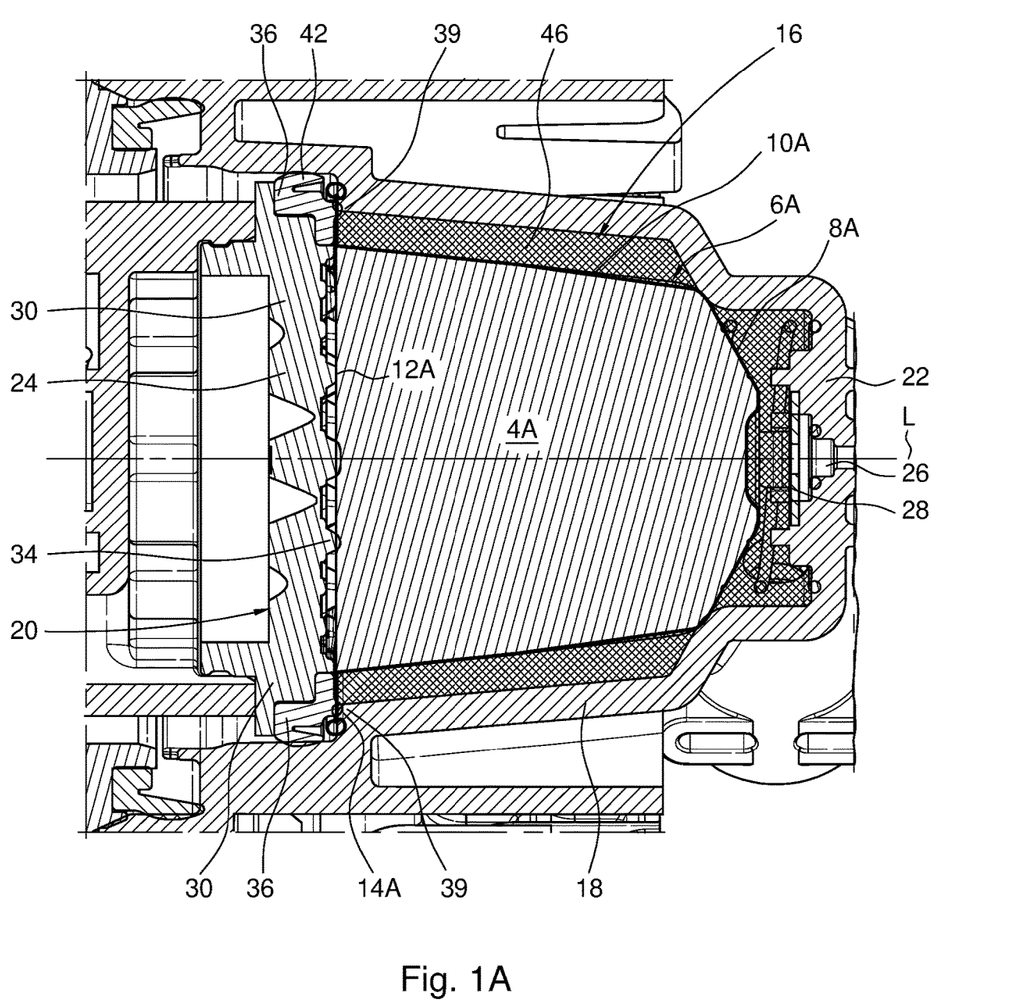
FIG. 1A shows a schematic cross sectional view of a part of an apparatus in cooperation with a first exchangeable capsule as applied in the system according to the invention.
Figure 1B:
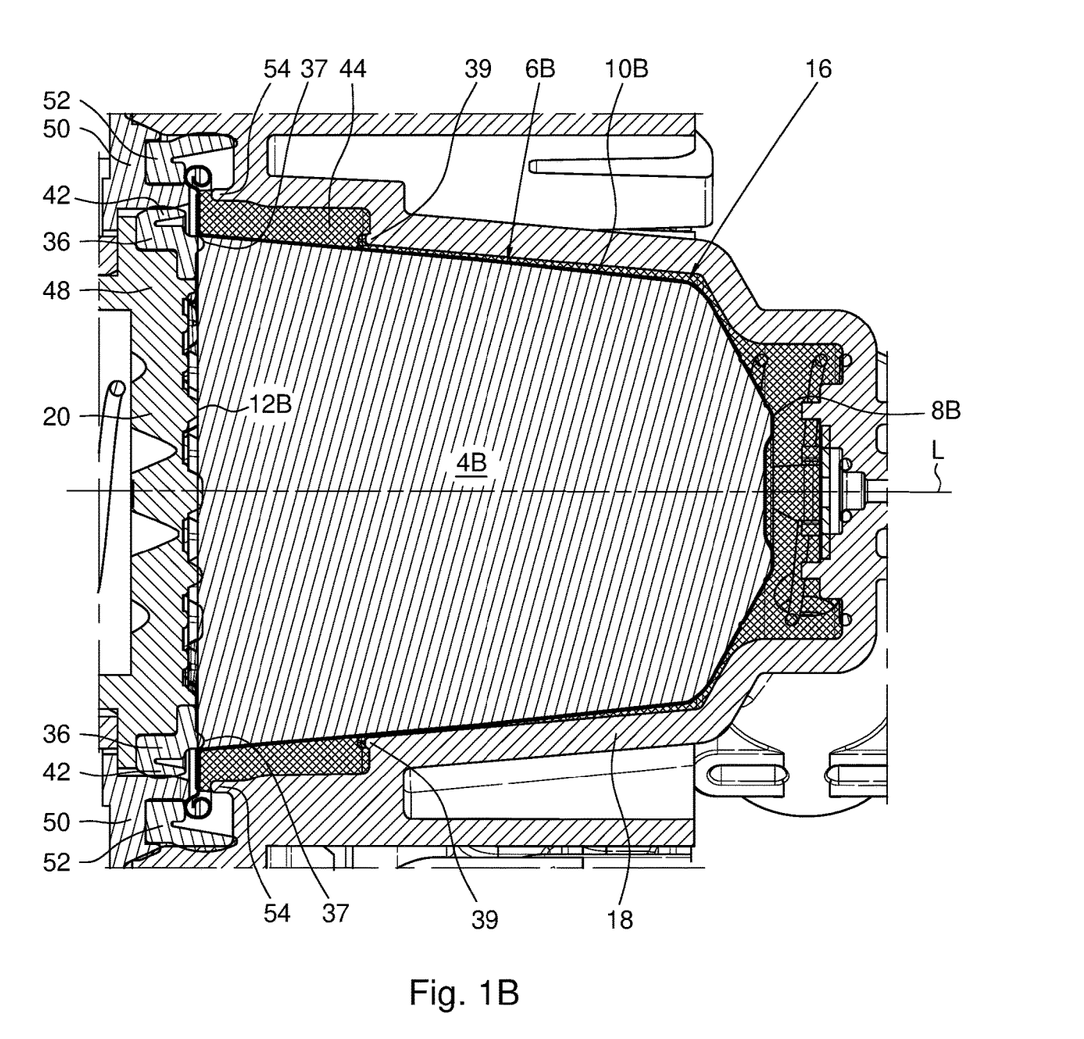
FIG. 1B shows a schematic cross sectional view of a part of an apparatus in cooperation with a second exchangeable capsule as applied in the system according to the invention.

FIGS. 1A and 1B show a schematic cross sectional view of a part of an apparatus in cooperation with an exchangeable capsule as applied in an example of a system according to the invention.

Figure 3A:
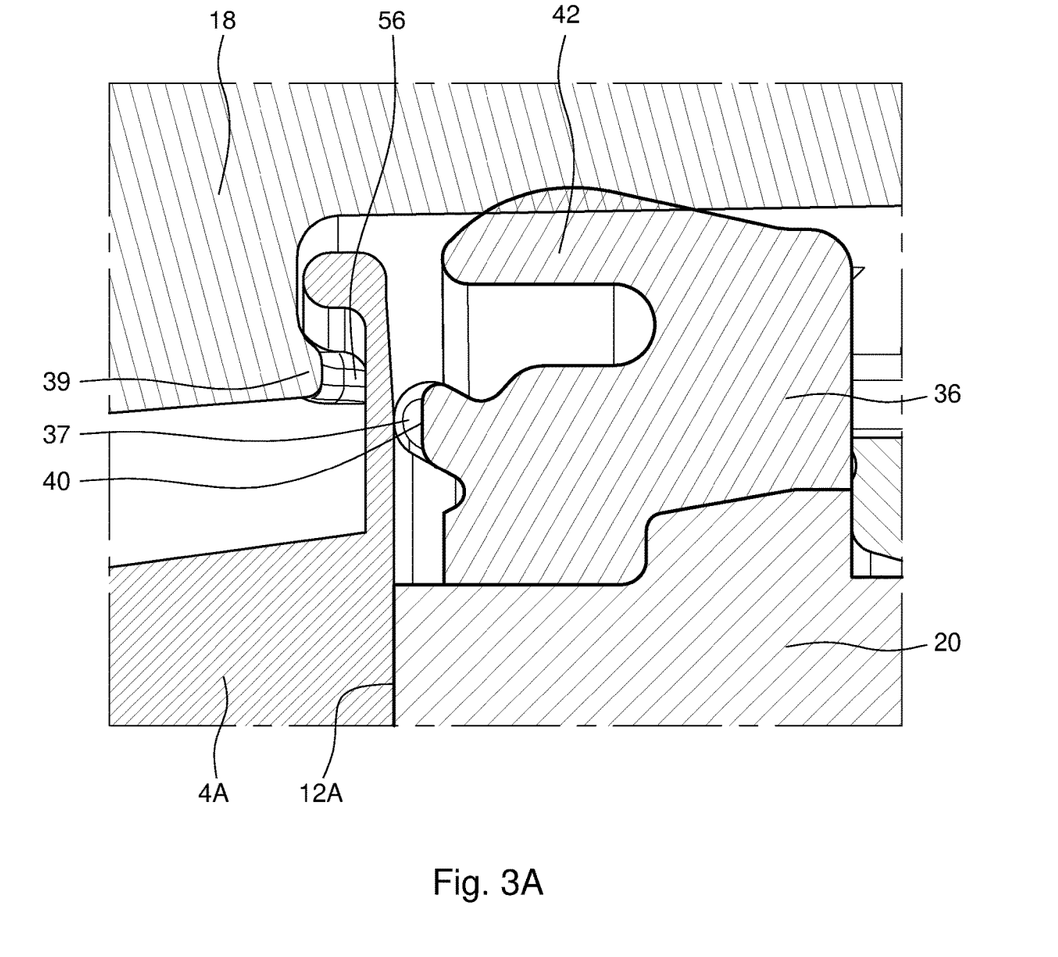
FIG. 3A shows a close up cross sectional view of a sealing configuration of a first exchangeable capsule in a brew chamber of an apparatus.
Figure 3B:
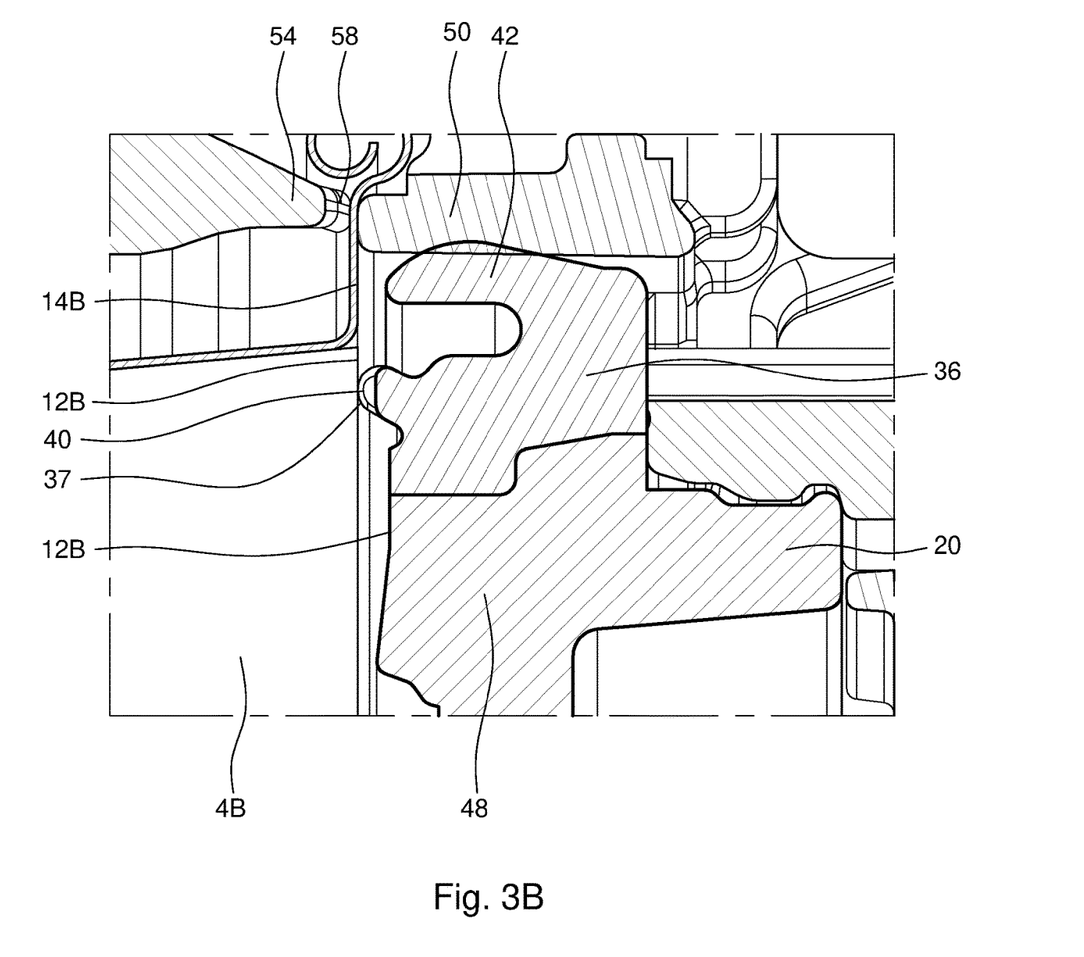
FIG. 3B shows a close up cross sectional view of a sealing configuration of a second exchangeable capsule in a brew chamber of an apparatus.

In view of the similarity, both capsules 4A, 4B will now be described simultaneously. The main difference between the exchangeable capsules being their size. The first exchangeable capsule 4A shown in FIGS. 1A and 3A is capsule with a smaller internal volume than the second exchangeable capsule 4B which is shown in FIGS. 1B and 3B. In this example, the capsules 4A, 4B both include a cup-shaped body GA, 6B. Here the cup-shaped body GA, 6B includes a bottom 8A, 8B and a circumferential wall 10B. A first end of the circumferential wall 10A, 10B is connected to the bottom 8A, 8B. The circumferential wall 10A, 10B may be slanted, under an angle with respect to a central axis L through the capsules 4A, 4B. For example, the angle of the slanted circumferential walls 10A, 10B may be the same for both capsules 4A, 4B. The slanted circumferential walls 10A, 10B provide a gradually decreasing cross section in a direction towards the bottom 8A, 8B of the capsules. The bottom 8A, 8B and the circumferential wall 10A, 10B can form a monolithic part. The cup-shaped body 6A, 6B includes a flange-like rim 14A, 14B which is connected at a second end of the circumferential wall 10A, 10B which second end is opposite the first end of the circumferential wall 10A, 10B and bounds an open end of the cup-shaped body 6A, 6B. The flange-like rim 14A, 14B is an outwardly extending rim. The bottom 8A, 8B, the circumferential wall 10A, 10B and the flange-like rim 14A, 14B can form a monolithic part. The capsules 4A, 4B both include a lid 12A, 12B. The lid 12A, 12B closes off the open end of the cup-shaped body 6A, GB. The lid 12A, 12B includes an exit area through which beverage can be drained from the capsule as explained below. In this example the lid 12A, 12B is connected to the flange-like rim 14A, 14B of the capsule 4A, 4B. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area. In this example, the capsules 4A, 4B are substantially rotation symmetric around the central axis L which extends from the bottom 8A, 8B to the lid 12A, 12B. So the slanted circumferential wall 10A, 10B is in fact a conical wall. The cup-shaped body GA, 6B and the lid 12A, 12B enclose an inner space of the capsule. The inner space includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space of the second capsule 4B is about twice the inner space of the first capsule 4A. For example, the first capsule 4A may include 4-8 grams, e.g. about 6 grains, of ground coffee. For example, the second capsule 4B may include 8-16 grams, e.g. about 12 grams, of ground coffee.

The cup-shaped body GA, 6B can be manufactured from a metal foil, such as aluminum foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminum foil, a plastics material, such as polypropylene or polyethylene, or a combination thereof, e.g. a laminate of metal and plastic. In the example the capsules 4A, 4B are so-called closed capsules. This indicates capsules that are hermetically closed prior to insertion into the apparatus. However, the capsules may also be of the open type, in that the bottom 8A, 8B anchor the lid 12A, 12B is/are perforated or comprise at least one opening, optionally covered with filter material, e.g. a woven or non-woven water permeable membrane.

In FIG. 1A, the exchangeable capsule 4A is arranged in a brew chamber 16 of the apparatus defined by a first brew chamber part 18 and a second brew chamber part 20. Here, the exchangeable capsule 4A is provided between an inlet side 22 and an outlet side 24 of the brew chamber 16. At the inlet side 22 of the brew chamber 16 a liquid dispensing device 26 is provided for supplying an amount of liquid to the brew chamber 16. Here, the first brew chamber part 18 comprises piercing means 28 for piercing the exchangeable capsule 4A, in particular the bottom 8 of the capsule. The piercing means 28 include a plurality of knives such as three knives. Liquid supplied by the liquid dispensing device 26 into the brew chamber 16 passes through the exchangeable capsule 4A to prepare the beverage.

The second brew chamber part 20 comprises an extraction plate 30 for receiving beverage from an exit area of the exchangeable capsule. Here, the exit area, such as the lid 12A of the exchangeable capsule 4A may open against the extraction plate 30. The extraction plate 30 in this example includes a plurality of relief elements 34 (see FIG. 2). Here the relief elements 34 are truncated pyramids. A rise in pressure inside the capsule 4A can cause the exit area to tear against the relief elements allowing beverage to exit the capsule 4A.

The beverage can pass through the extraction plate 30 via apertures 56 in the extraction plate 30. Subsequently, the beverage can flow to an outlet of the extraction plate 30 from which the beverage can be discharged into a receptacle such as a cup.

To prevent leakage and prevent liquid from bypassing the exchangeable capsule 4A, a sealing member 36 is arranged providing a liquid sealing engagement between the capsule 4A and a wall of the brew chamber 16A. More particular, the sealing member 36 comprises annular front sealing member 37, which, in this example, is embodied as an annular protrusion, for abutting against the lid 12A of the capsule 4A providing a liquid sealing engagement. Additionally, the sealing member 36 may be arranged in the system 1 such that it provides an additional liquid sealing engagement between the capsule 4A and the first brew chamber part 18. The first brew chamber part 18 also comprises a first annular abutment surface 39 for abutting against the flange-like rim 14 of the capsule. This enables the first capsule to be held in place. In a particular embodiment, not shown, the first annular abutment surface 39 may sealingly engage with the rim 14A of the capsule. The first annular abutment surface 39 may for example comprise additional openings, such as grooves, for enhancing air passage between the first annular abutment surface 39 and the capsule rim 14A.

The system further comprises an air purge opening bounded by an air purge groove 40 in the front sealing member 37 for allowing air to escape from a volume of the brew chamber 16 between the inlet side 22 and the sealing member 36. In particular, trapped air in a volume of the brew chamber not occupied by the capsule 4A, between the inlet side 22 and the sealing member 36 can escape through the air purge opening formed by the air purge groove 40. A volume 46 of the brew chamber not occupied by the exchangeable capsule is denoted in FIG. 1A by the shaded area between the capsule body 6A and the first brew chamber part 18. When brewing a beverage using the exchangeable capsule 4A this volume will fill with liquid. Air can be displaced by the liquid and may escape through the air purge opening. The air purge opening is preferably provided at high position relative to ground level, as the air in the brew chamber will rise. This allows the escape of as much air as possible, ideally all air. Air that may be present in the exchangeable capsule 4A will be displaced by the liquid entering the capsule through the bottom 8A of the capsule. Under the influence of pressure build up in the capsule 4A, the exit area of the capsule, e.g. the lid 12A of the capsule, may tear providing an outlet for the beverage as well as the air in the capsule. Air in the capsule can thus escape through the exit area of the capsule 4A, and subsequently through the apertures in the extraction plate 30.

The air purge groove 40 is formed by an indentation in the annular front sealing member 37 and allows air to bypass the liquid sealing engagement. Here, air can escape from the brew chamber 16 through the air purge opening and through the apertures in the extraction plate 30. An escape path for air in the volume of the brew chamber not occupied by the exchangeable capsule between the inlet side 22 and the sealing member 36, leads around the flange of the capsule through the air purge opening. The air purge groove is closable under the influence of liquid pressure in the brew chamber, more particular of the liquid pressure in the capsule 4A leading to bulging of the lid 12A thereby at least partly closing the air purge opening bounded by the air purge groove 40. When liquid fills up the volume of the brew chamber not occupied by the exchangeable capsule 4A, and reaches the air purge groove 30, the high hydraulic resistance of the liquid with respect to air induces a pressure increase. The forces accompanied by this pressure increase lead to a pressure build up in the interior of exchangeable capsule and the lid 12A of the capsule 4A will bulge. This contributes to the closure of the air purge groove 40.

In the example shown in the figures, the sealing member 36 is further arranged for providing a liquid sealing engagement between the first brew chamber part 18 and the second brew chamber part 20. Here, the sealing member 36 comprises a resilient lip 42, for providing a self-reinforcing sealing engagement between the first 18 and second brew chamber part 20.

FIG. 1B shows the same brew chamber 16 of the same apparatus as shown in FIG. 1A, wherein the brew chamber is provided with a second exchangeable capsule 4B. The second exchangeable capsule is larger in size than the first exchangeable capsule 4A shown in FIG. 1A.

The first brew chamber part 18 is arranged to selectively hold one of the first 4A and second exchangeable capsule 4B. Consequently, the dimensions of the first brew chamber part 18 will be adapted to selectively accommodate one of the first 4A and second capsule 4B. As shown in the FIG. 1B, the first brew chamber part 18 includes a second volume 44 not occupied by the second exchangeable capsule 4B when the brew chamber holds the second exchangeable capsule 4B, which second volume 44 is arranged for receiving the second brew chamber part 24 when the brew chamber holds the first exchangeable capsule 4A. This second volume 44 may hold a substantial amount of air. To avoid or reduce after-dripping it has been established that replacing this volume of air by liquid is highly beneficial. Moreover, as shown in FIG. 1A, the first brew chamber part also includes a first volume 46 not occupied by the first exchangeable capsule 4A when the brew chamber 16 holds the first exchangeable capsule 4A, which first volume 46 is arranged for holding part of the second exchangeable capsule 4B when the brew chamber holds the second capsule 4B.

To minimise the volume of the brew chamber, the second brew chamber part therefore comprises a central portion 48 and a peripheral portion 50. The central portion 48 comprises the extraction plate 30. The central portion 48 is also provided with the sealing member 36. The peripheral portion 50 comprises a further sealing member 52 arranged to provide a liquid sealing engagement between the peripheral portion 50 and the first brew chamber part 18 when forming the brew chamber for holding the second exchangeable capsule 4B. As can be seen in FIG. 1B, the resilient lip 42 of the sealing member 36 of the second brew chamber part 20 provides a sealing between the central portion 48 and the peripheral portion 50 when the brew chamber holds the second exchangeable capsule 4B.

The first brew chamber part 18 also comprises a second annular abutment surface 54 for abutting against a flange-like rim of the second capsule 4B. This enables the second capsule 4B to be held in place. In a particular embodiment, not shown, the second annular abutment surface 54 may sealingly engage with the rim 14B of the second capsule. However, as is visible in FIG. 3B, the second annular abutment surface 54 may for example comprise additional openings 58, such as grooves, for enhancing air passage between the second annular abutment surface 54 and the rim 14B of the second exchangeable capsule. The first brew chamber part 18 may comprise further abutment surfaces to enable additional capsule types to be inserted into the brew chamber 16.

Figure 2:
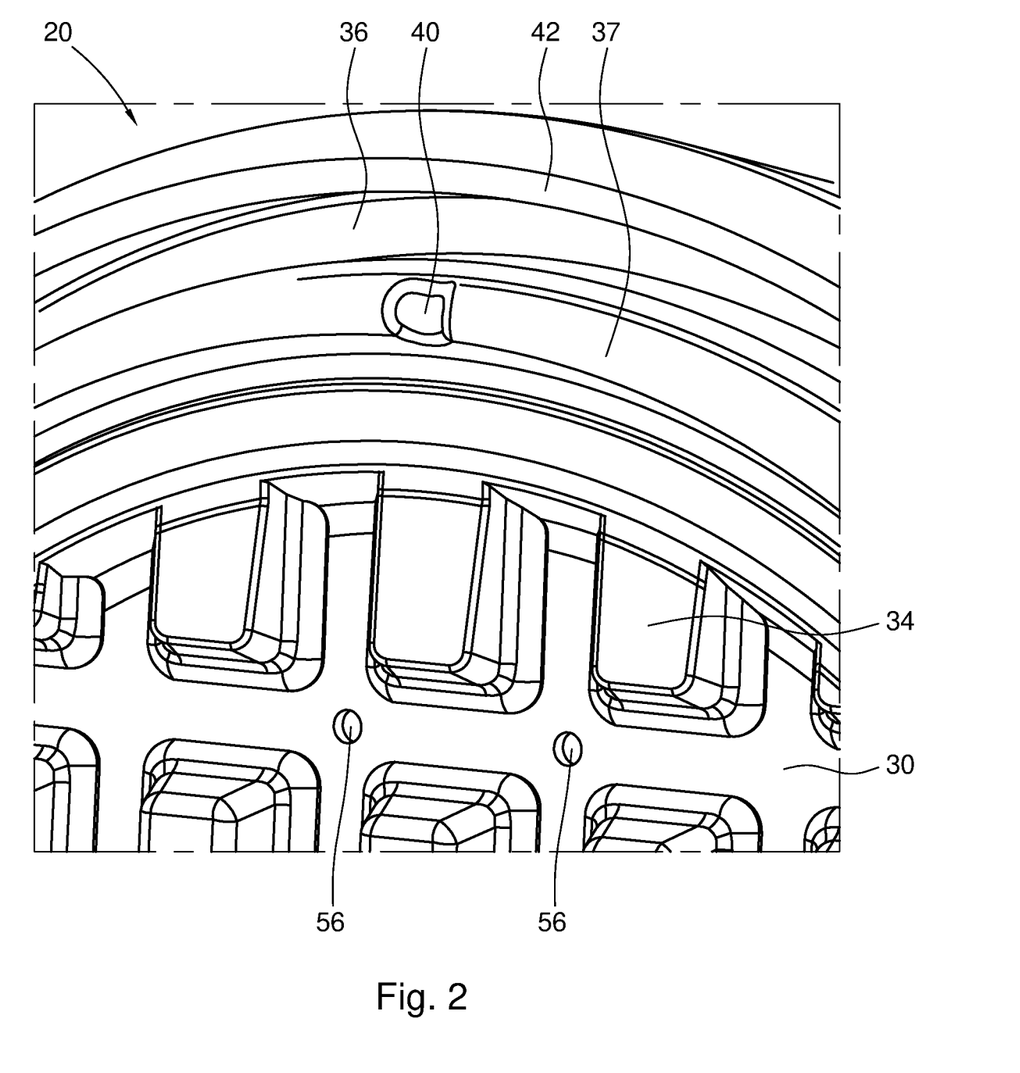
FIG. 2 shows a close up perspective view of the second brew chamber part of an apparatus of the system comprising the air purge groove.

FIG. 2 shows a close up perspective view of the second brew chamber part 20 comprising the air purge groove 40 at an annular front seal member 37 of the sealing member 36. The sealing member 36 is arranged circumferentially around the extraction plate 30 having relief elements 34. The extraction plate 36 furthermore comprises a plurality of apertures 56. Here, the sealing member 36 also comprises a resilient lip 42 for providing a sealing engagement between the first 18 and second brew chamber part 20 when the brew chamber holds the first exchangeable capsule 4A, and/or between the central portion 48 and peripheral portion 50 of the second brew chamber part 20 when the brew chamber holds the second exchangeable capsule 4B.

FIG. 3A shows a close up cross sectional view of the system 1 of a sealing configuration between the first exchangeable capsule 4A and the second brew chamber part 20. The annular protrusion 37 abuts the lid 12A of the first exchangeable capsule 4A at a location at the rim 14A and forms a liquid sealing engagement. The air purge opening is formed by the air purge groove 40 and the lid 12A of the capsule. There is a gap 56 between the first annular abutment surface 39 and the rim 14A of the capsule 4A to enable air to flow around the rim 14A. The resilient lip 42 is arranged to provide a sealing between the first brew chamber part 18 and the second brew chamber part 20.

FIG. 3B shows a close up cross sectional view of the system 1 of a sealing configuration between the second exchangeable capsule 4B and the second brew chamber part 20. The annular protrusion 37 abuts the lid 12B of the second exchangeable capsule 4B and forms a liquid sealing engagement. The air purge opening is formed between the air purge groove 40 and the lid 12B of the capsule. The second brew chamber part is formed by the central portion 48 and the peripheral portion 50 wherein the central 48 and peripheral 50 portions are sealed by the resilient lip 42.

In the examples, the capsule body and lid are made of aluminium foil, preferable polymer coated aluminium foil to allow easy welding of the lid to the body. It will be appreciated that the capsule body anchor lid can be made of a wide variety of materials considered suitable by the skilled person and capable of being processed into a sheet, film or foil using techniques conventionally known in the art such as extrusion, co-extrusion, injection molding, blow molding, vacuum forming, etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

Figure 4:
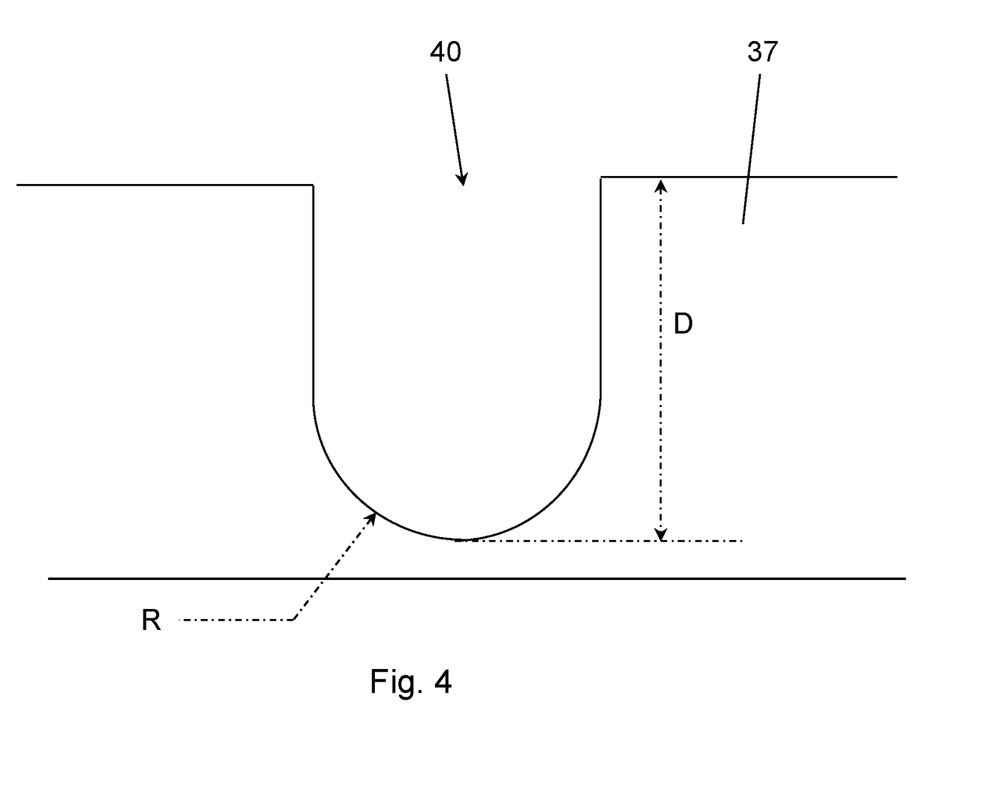
FIG. 4 shows a side view of an example of a sealing member at the location of an example of an U-shaped air purge groove.

FIG. 4 shows a side view of an example of the sealing member 37 at the location of an U-shaped purge groove 40. The U-shaped air purge groove has a depth D and a bottom with a radius R as shown. Various groove dimensions which fall within the scope of the present invention are shown in below table:

|  | Radius R (mm) | Depth D (mm) | Cross-sectional area (mm²) |
| --- | --- | --- | --- |
| Sample 1 | 1.0 | 0.25 | 0.227 |
| Sample 2 | 1.0 | 0.35 | 0.369 |
| Sample 3 | 1.0 | 0.45 | 0.529 |
| Sample 4 | 0.2 | 0.30 | 0.103 |
| Sample 5 | 0.2 | 0.40 | 0.143 |
| Sample 6 | 0.2 | 0.50 | 0.183 |
| Sample 7 | 0.35 | 0.30 | 0.158 |
| Sample 8 | 0.35 | 0.40 | 0.227 |
| Sample 9 | 0.35 | 0.50 | 0.297 |
| Sample 10 | 0.5 | 0.30 | 0.198 |
| Sample 11 | 0.5 | 0.40 | 0.293 |
| Sample 12 | 0.5 | 0.50 | 0.393 |
| Sample 13 | 0.5 | 0.35 | 0.245 |

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage

The invention claimed is:

1. System for preparing a quantity of beverage suitable for consumption, the system comprising:
an exchangeable capsule, the exchangeable capsule comprising a cup-shaped body and a lid; the cup-shaped body having a bottom, a circumferential wall and a flange, the lid being sealed to the flange; and
an apparatus comprising a first brew chamber part having a cavity for holding the exchangeable capsule and a second brew chamber part for closing the first brew chamber part to form a brew chamber, the second brew chamber part comprising a sealing member for providing a liquid sealing engagement between the second brew chamber part and the lid of the exchangeable capsule,
wherein the sealing member comprises an air purge groove forming an air purge opening between the sealing member and the lid of the capsule for allowing air in the brew chamber to escape to an exterior of the apparatus while pressurised liquid is supplied into the brewing chamber for preparing the beverage.

2. The system according to claim 1, wherein the air purge groove is bounded by a resilient material.

3. The system according to claim 1, wherein the lid of the capsule is arranged to bulge under the effect of liquid pressure in an interior space of the capsule in such a way as to substantially close the air purge opening.

4. The system according to claim 3, wherein the lid comprises a foil.

5. The system according to claim 1, wherein the air purge opening is in fluid communication with an aperture in the second brew chamber part.

6. The system according to claim 1, wherein the air purge groove comprises a U-shaped cross-profile.

7. The system according to claim 1, wherein a cross-sectional area of the air purge groove is approximately between 0.1 mm 2 and 0.55 mm$^2$.

8. The system according to claim 1, wherein a depth of a cross-section of the air purge groove is approximately between 0.2 mm and 0.6 mm.

9. The system according to claim 1, wherein a width of a cross-section of the air purge groove is approximately between 0.3 mm and 2.1 mm.

10. The system according to claim 6, wherein the U-shaped cross-profile has a depth (D), a bottom with a radius (R), and and a cross sectional area in accordance with one of Structure 1 through Structure 13 in the following table:

|  | Radius R (mm) | Depth D (mm) | Cross-sectional area (mm$^2$) |
| --- | --- | --- | --- |
| Sample Structure 1 | 1.0 | 0.25 | 0.227 |
| Sample Structure 2 | 1.0 | 0.35 | 0.369 |
| Sample Structure 3 | 1.0 | 0.45 | 0.529 |
| Sample Structure 4 | 0.2 | 0.30 | 0.103 |
| Sample Structure 5 | 0.2 | 0.40 | 0.143 |
| Sample Structure 6 | 0.2 | 0.50 | 0.183 |
| Sample Structure 7 | 0.35 | 0.30 | 0.158 |
| Sample Structure 8 | 0.35 | 0.40 | 0.227 |
| Sample Structure 9 | 0.35 | 0.50 | 0.297 |
| Sample-Structure 10 | 0.5 | 0.30 | 0.198 |
| Sample-Structure 11 | 0.5 | 0.40 | 0.293 |
| Sample-Structure 12 | 0.5 | 0.50 | 0.393 |
| Sample-Structure 13 | 0.5 | 0.35 | 0.245 |

11. The system according to claim 1, wherein the exchangeable capsule is a first exchangeable capsule and wherein the system further comprises a second exchangeable capsule having a different size than the first exchangeable capsule, the brew chamber being arranged to selectively hold one of the first exchangeable capsule and the second exchangeable capsule.

12. The system according to claim 11, wherein the first exchangeable capsule and the second exchangeable capsule have substantially the same length to diameter ratio.

13. The system according to claim 11 wherein the cavity of the first brew chamber part is arranged for selectively holding one of the first exchangeable capsule and the second exchangeable capsule.

14. The system according to claim 13, wherein the second brew chamber part is movable into a first position and a second position, wherein in the first position the first and second brew chamber parts form the brew chamber for holding the first exchangeable capsule, and in the second position the first and second brew chamber parts form the brew chamber for holding the second exchangeable capsule.

15. The system according to claim 11, wherein the second brew chamber part comprises a central portion and a peripheral portion, the central portion being movable into a first position for forming the brew chamber for holding the first exchangeable capsule and a second position forming the brew chamber for holding the second exchangeable capsule.

16. The system according to claim 1, wherein the sealing member is an annular front sealing member which is provided on a front face of the second brew chamber part, and the front face of the second brew chamber part is directed towards the first brew chamber part.

17. The system according to claim 16, wherein the front sealing member has a diameter which is smaller than the outer diameter of the lid of the exchangeable capsule, so that during a brewing cycle the front sealing member engages the lid.

* * * * *